(12) United States Patent
Wu

(10) Patent No.: US 8,783,970 B2
(45) Date of Patent: *Jul. 22, 2014

(54) OPTICAL FIBER MODULE

(71) Applicant: Ezconn Corporation, Taipei (TW)

(72) Inventor: Chin-Tsung Wu, Taipei (TW)

(73) Assignee: Ezconn Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,684

(22) Filed: Jul. 29, 2013

(65) Prior Publication Data

US 2013/0308911 A1 Nov. 21, 2013

Related U.S. Application Data

(63) Continuation of application No. 13/106,063, filed on May 12, 2011, now Pat. No. 8,511,912.

(51) Int. Cl.
*G02B 6/36* (2006.01)
(52) U.S. Cl.
USPC .............. 385/88; 385/78; 385/72; 385/92
(58) Field of Classification Search
None
See application file for complete search history.

(56) References Cited

U.S. PATENT DOCUMENTS

| 7,572,064 | B2 * | 8/2009 | deJong .......................... 385/65 |
| 7,702,198 | B2 * | 4/2010 | Shibayama ..................... 385/33 |
| 2007/0122091 | A1 * | 5/2007 | Kobayashi ..................... 385/104 |
| 2011/0033159 | A1 * | 2/2011 | Kojima et al. .................. 385/79 |
| 2012/0288238 | A1 * | 11/2012 | Park et al. ...................... 385/80 |

* cited by examiner

*Primary Examiner* — Hemang Shanghavi
(74) *Attorney, Agent, or Firm* — Litron Patent & Trademark Office; Min-Lee Teng

(57) ABSTRACT

An optical fiber module includes an optical transmission line and a fiber stub structure. The optical transmission line has an optical fiber core, a coating enclosing the optical fiber core and a buffer layer enclosing the coating. A part of the optical fiber core is exposed to outer side of a free end of the optical transmission line. The fiber stub structure includes a sleeve and a ferrule. The sleeve has an internal central hole for accommodating the optical transmission line and an oblique hole in communication with the central hole for accommodating the ferrule. The ferrule has an internal passageway for accommodating a part of the optical fiber core of the optical transmission line. When installed, under the restriction of the oblique hole, the ferrule is disposed in the sleeve in an inclined state.

20 Claims, 2 Drawing Sheets

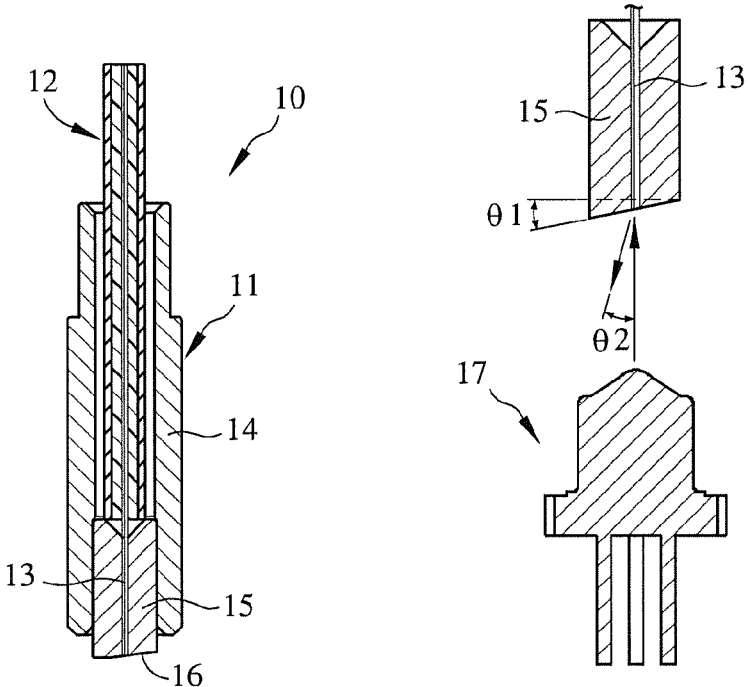
FIG.1A PRIOR ART
FIG.1B PRIOR ART
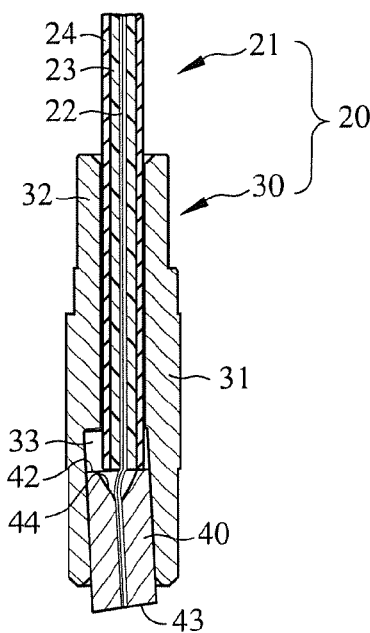
FIG.2

OPTICAL FIBER MODULE

RELATED APPLICATION

This application is a continuation of application Ser. No. 13/106,063, filed May 12, 2011, now U.S. Pat. No. 8,511,912, all of which is incorporated herein by reference in its entirety.

BACKGROUND OF THE DISCLOSURE

1. Field of the Disclosure

The present invent ion relates to an optical fiber module capable of increasing optical coupling efficiency.

2. Brief Description of the Related Art

In an optical fiber communication system, optical sub-assembly for transceivers is an important medium for conversion between optical signals and electrical signals. The optical sub-assembly for transceivers can be classified into transmitting optical sub-assembly (TOSA) for transmitting optical signals, bi-direction optical sub-assembly (BOSA) capable of receiving bi-direction signals in the same optical fiber and tri-direction optical sub-assembly (TRI-DI OSA) capable of receiving both digital signals and analog signals and transmitting digital signals. Either of the TOSA, BOSA and TRI-DI OSA is connected with an optical fiber module 10. Referring to FIG. 1A, the optical fiber module 10 includes a fiber stub structure 11 and an optical transmission line 12 coaxially disposed in the fiber stub structure 11. In general, the optical alignment between the TOSA, BOSA or TRI-DI OSA and the optical fiber module 10 necessitates an X-Y-Z precision positioning stage for performing optical coupling alignment between the optical fiber 13 of the optical transmission line 12 and the light-emitting element of the TOSA, BOSA or TRI-DI OSA so as to transmit optical signals.

The fiber stub structure 11 includes a sleeve 14 and a ferrule 15 coaxially disposed in the sleeve 14 and positioned at a bottom end thereof. The optical fiber 13 partially lengthwise extends into the ferrule 15. The bottom face of the ferrule 15 is an inclined face 16 for preventing reflection light from being incident on the light-emitting element so as to avoid interference of noises with the light-emitting element 17.

Referring to FIG. 1B, as to geometrical optics, the calculation formula of angle of emergence of light beam is as follows:

$n \sin(\theta1) = \sin(\theta1 + \theta2)$, wherein:

n: refractive index of optical fiber;

.θ1: grinding angle of optical fiber on the end face of the fiber stub; and

θ2: angle contained between the axis of optical fiber and the direction of emergence of the light.

In the above arrangement, the ferrule 15 is disposed in the sleeve 14 in an upright state. In this case, according to the above formula, the direction of incidence of optical signal of the light-emitting element 17 is collinear with the optical fiber 13 rather than coaxial with the direction of emergence of the light of the optical fiber 13. Therefore, according to the theory that an optimal path is achieved when the direction of incidence of light and the direction of emergence of light, (that is, angle of incidence of light and angle of emergence of light), are coaxial with each other, this will cause loss to incident optical signal and needs to be overcome.

SUMMARY OF THE DISCLOSURE

A primary object of the present invention is to provide an optical fiber module, which can increase optical coupling efficiency without changing the direction of incidence of light of the light-emitting element.

To achieve the above and other objects, the optical fiber module of the present invention includes an optical transmission line and a fiber stub structure. The optical transmission line has an optical fiber core, a coating enclosing the optical fiber core and a buffer layer enclosing the coating. A part of the optical fiber core is exposed to outer side of a free end of the optical transmission line. The fiber stub structure includes a sleeve and a ferrule. The sleeve has an internal central hole for accommodating the optical transmission line and an oblique hole in communication with the central hole for accommodating the ferrule. The ferrule has an internal passageway for accommodating a part of the optical fiber core of the optical transmission line. When installed, under the restriction of the oblique hole, the ferrule is disposed in the sleeve in an inclined state to rectify the direction of emergence of the light to be coaxial with the direction of incidence of the optical signal of the light-emitting element. Accordingly, the loss to the incident optical signal is reduced and the optical coupling efficiency is increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1A is a sectional view of a conventional optical fiber module;

FIG. 1B is a sectional view showing that the conventional ferrule is arranged in an upright state, also showing the optical paths of the incident optical signal and the emergent optical signal;

FIG. 2 is a sectional view of the optical fiber module of the present invention;

DETAILED DESCRIPTION OF THE INVENTION

Figure 3:
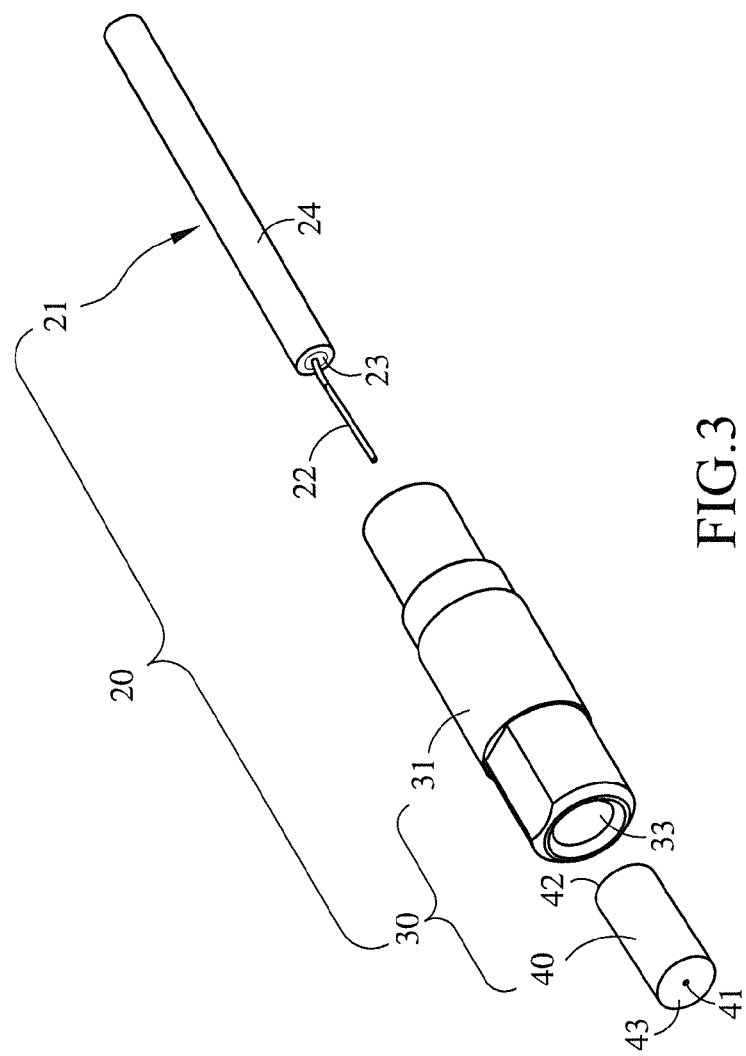
FIG. 3 is a perspective exploded view of the optical fiber module of the present invention.

Please refer to FIGS. 2 and 3. The optical fiber module 20 of the present invention includes an optical transmission line 21 and a fiber stub structure 30. The optical transmission line 21 has an optical fiber core 22, a coating 23 enclosing the optical fiber core 22 and a buffer layer 24 enclosing the coating 23. In practice, prior to installation of the optical transmission line 21 into the fiber stub structure 30, the coating 23 and the buffer layer 24 of a free end of the optical transmission line 21 must be partially removed to expose a part of the optical fiber core 22 to outer side of the free end of the optical transmission line 21.

The fiber stub structure 30 includes a sleeve 31 and a ferrule 40. The sleeve 31 has an internal central hole 32. The central hole 32 has such a diameter as to accommodate the optical transmission line 21. The sleeve 31 further has an oblique hole 33 in communication with the central hole 32. The oblique hole 33 has such a diameter as to accommodate the ferrule 40, whereby the ferrule 40 is disposed in the sleeve 31 in an inclined state.

The ferrule 40 has an internal passageway 41, which has such a diameter as to accommodate a part of the optical fiber core 22 of the optical transmission line 21. The ferrule 40 has a first end 42 and a second end 43 opposite to the first end 42.

The first end 42 has a guide sink 44 for quickly inserting the optical fiber core 22 into the passageway 41. The second end 43 is an inclined face for preventing reflection light from being directly incident on the light-emitting element so as to avoid interference of noises with the light-emitting element.

Figure 4:
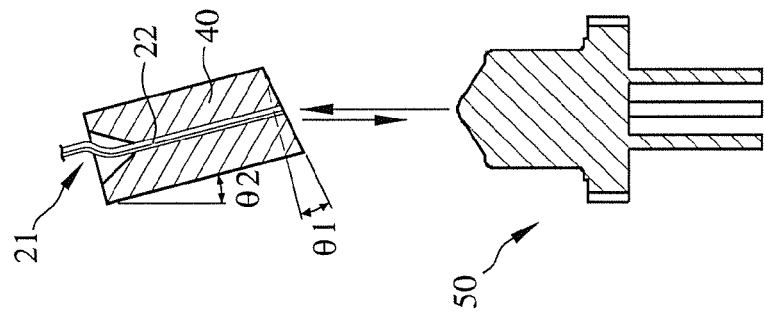
FIG. 4 is a sectional view showing that the ferrule of the present invention is inclined by an angle, also showing the optical paths of the incident optical signal and the emergent optical signal.

When installed, under the restriction of the oblique hole 33, the ferrule 40 is disposed in the sleeve 31 in an inclined state. Therefore, the direction of emergence of the light is coaxial with the direction of incidence of the light to meet the calculation formula of angle of emergence of light beam. Therefore, the optical signals emitted from the light-emitting element 50 can be mass-accumulated and coupled to the optical fiber core 22 of the optical transmission line 21 to reduce coupling loss and greatly increase optical coupling efficiency. As shown in FIG. 4, the ferrule 40 is inclined by an angle θ2 for rectifying the direction of emergence of the light from the ferrule 40 to be coaxial with the direction of incidence of the optical signals of the light-emitting element 50. In this case, a best optical coupling efficiency can be achieved.

The above embodiment is only used to illustrate the present invention, not intended to limit the scope thereof. It is understood that many changes or modifications of the above embodiment can be made by those who are skilled in this field without departing from the spirit of the present invention. The scope of the present invention is limited only by the appended claims.

What is claimed is:

1. An optical fiber module comprising:
an optical transmission line comprising an optical fiber core comprising a first portion extending in a first direction and a second portion extending in a second direction oblique to said first direction, wherein a light emerging from a terminal end of said optical fiber core is configured to be substantially coaxial with a light incident to said terminal end of said optical fiber core; and
a fiber stub fixed with said optical fiber core, wherein said fiber stub receives said first and second portions of said optical fiber core.

2. The optical fiber module of claim 1, wherein said fiber stub comprises a sleeve receiving said first and second portions of said optical fiber core, wherein a first hole in said sleeve accommodates said first portion of said optical fiber core and extends in said first direction, wherein a second hole in said sleeve accommodates said second portion of said optical fiber core and extends in said second direction, wherein said second hole communicates with said first hole.

3. The optical fiber module of claim 2, wherein said optical transmission line further comprises a jacket enclosing said optical fiber core, wherein said jacket comprises a portion in said first hole in said sleeve and a terminal end in said second hole in said sleeve.

4. The optical fiber module of claim 1, wherein said optical fiber core has a light incident surface not normal but oblique to said second direction.

5. The optical fiber module of claim 4, wherein said fiber stub comprises a ferrule receiving said second portion of said optical fiber core, wherein said ferrule has a surface substantially coplanar with said light incident surface.

6. The optical fiber module of claim 4 further comprising a light emitting element optically coupled to said light incident surface.

7. The optical fiber module of claim 1, wherein said fiber stub comprises a sleeve receiving said first and second portions of said optical fiber core, wherein a first hole in said sleeve accommodates said first portion of said optical fiber core and extends in said first direction, wherein a second hole in said sleeve accommodates said second portion of said optical fiber core and extends in said second direction, wherein said second hole communicates with said first hole, and a ferrule receiving said second portion of said optical fiber core, wherein said second hole in said sleeve accommodates a portion of said ferrule, wherein said optical transmission line further comprises a jacket enclosing said optical fiber core, wherein said jacket comprises a portion in said first hole in said sleeve and a terminal end in said second hole in said sleeve, wherein said terminal end of said jacket contacts said ferrule.

8. The optical fiber module of claim 1, wherein said fiber stub comprises a ferrule receiving said second portion of said optical fiber core, wherein a guide sink at an end of said ferrule accommodates a curvature of said optical fiber core between said first and second portions of said optical fiber core.

9. An optical fiber module comprising:
an optical transmission line having an optical fiber core and a jacket enclosing a first portion of said optical fiber core;
a sleeve receiving a portion of said optical transmission line, wherein a first hole in said sleeve accommodates said first portion of said optical fiber core and extends in a first direction; and
a ferrule comprising a first portion in a second hole in said sleeve, wherein said second hole communicates with said first hole and extends in a second direction oblique to said first direction, wherein said jacket comprises a portion in said first hole in said sleeve and a terminal end in said second hole in said sleeve, wherein an internal passageway in said ferrule accommodates a second portion of said optical fiber core not enclosed by said jacket.

10. The optical fiber module of claim 9, wherein said terminal end of said jacket contacts said ferrule.

11. The optical fiber module of claim 9, wherein said optical fiber core has a light incident surface not normal but oblique to said second direction.

12. The optical fiber module of claim 11 further comprising a light emitting element optically coupled to said light incident surface.

13. The optical fiber module of claim 9, wherein said ferrule comprises a second portion outwardly protruding from a front end of said second hole, wherein said second portion has a front surface, far away from said front end of said second hole, not normal but oblique to said second direction.

14. The optical fiber module of claim 9, wherein a guide sink at an end of said ferrule accommodates a curvature of said optical fiber core between said first and second portions of said optical fiber core.

15. An optical fiber module comprising:
an optical transmission line having an optical fiber core and a jacket enclosing a first portion of said optical fiber core;
a sleeve receiving a portion of said optical transmission line, wherein a first hole in said sleeve accommodates said first portion of said optical fiber core and extends in a first direction; and
a ferrule comprising a first portion in a second hole in said sleeve, wherein said second hole communicates with said first hole and extends in a second direction oblique to said first direction, wherein said second hole accommodating said ferrule has a transverse dimension not greater than that of said second hole not accommodating said ferrule, wherein said second hole not accommodating said ferrule is between said first hole and said second hole accommodating said ferrule, wherein an internal passageway in said ferrule accommodates a second portion of said optical fiber core not enclosed by said jacket.

16. The optical fiber module of claim 15, wherein a guide sink at an end of said ferrule accommodates a curvature of said optical fiber core between said first and second portions of said optical fiber core.

17. The optical fiber module of claim 15, wherein said ferrule comprises a second portion outwardly protruding from a front end of said second hole, wherein said second portion has a front surface, far away from said front end of said second hole, not normal but oblique to said second direction.

18. The optical fiber module of claim 15, wherein said second hole not accommodating said ferrule accommodates said jacket.

19. The optical fiber module of claim 15, wherein said transverse dimension of said second hole accommodating said ferrule is substantially equal to that of said second hole not accommodating said ferrule.

20. The optical fiber module of claim 15, wherein said jacket contacts said ferrule.

\* \* \* \* \*